United States Patent
Kim et al.

(10) Patent No.: US 10,224,583 B2
(45) Date of Patent: Mar. 5, 2019

(54) SECONDARY BATTERY MODULE HAVING THROUGH TYPE COOL CHANNEL

(71) Applicant: SK INNOVATION CO., LTD., Seoul (KR)

(72) Inventors: Deok Soo Kim, Daejeon (KR); Hyuk Chan Tae, Daegu (KR); Ji Seok Lee, Sejong (KR); Dong Hun Lim, Goyang-si (KR)

(73) Assignee: SK INNOVATION CO., LTD., Seoul (KR)

( * ) Notice: Subject to any disclaimer, the term of this patent is extended or adjusted under 35 U.S.C. 154(b) by 132 days.

(21) Appl. No.: 14/399,356

(22) PCT Filed: Mar. 5, 2013

(86) PCT No.: PCT/KR2013/003995
§ 371 (c)(1),
(2) Date: Nov. 6, 2014

(87) PCT Pub. No.: WO2013/168989
PCT Pub. Date: Nov. 14, 2013

(65) Prior Publication Data
US 2015/0099146 A1  Apr. 9, 2015

(30) Foreign Application Priority Data
May 11, 2012  (KR) .................. 10-2012-0050020

(51) Int. Cl.
*H01M 10/6557* (2014.01)
*H01M 10/613* (2014.01)
(Continued)

(52) U.S. Cl.
CPC ....... *H01M 10/613* (2015.04); *H01M 2/1077* (2013.01); *H01M 2/12* (2013.01);
(Continued)

(58) Field of Classification Search
CPC ............... H01M 10/0413; H01M 2220/20
(Continued)

(56) References Cited

U.S. PATENT DOCUMENTS 7,892,669 B2 * 2/2011 Yang .................. H01M 2/0212
429/100
7,993,776 B2 8/2011 Lee et al.
(Continued)

FOREIGN PATENT DOCUMENTS

CN            2847550 Y       12/2006
KR         20130126044 A  *  11/2013  ............ H01M 10/50
WO      WO-2012023753 A2 *  2/2012   .......... B60L 11/1879

OTHER PUBLICATIONS

Machine translation KR20130126044A.*
International Search Report for corresponding International Application No. PCT/KR2013/003995, dated Aug. 21, 2013.

*Primary Examiner* — Jonathan G Leong
*Assistant Examiner* — Victoria H Lynch
(74) *Attorney, Agent, or Firm* — Hauptman Ham, LLP (57) ABSTRACT

Provided is a secondary battery module having a through type cool channel for preventing contaminated air generated from a pouch type cell from being introduced into a vehicle, and more particularly, a secondary battery module having a through type cool channel capable of preventing contaminated air generated from battery cells from being introduced into a vehicle and easily cooling heat generated from the battery cells, by sealing an electrode assembly, in which a plurality of battery cells are stacked, by a case, forming a separate gas discharge pipe in the case to discharge the gases to a designated place, and coupling both ends of a partition tube having a cool channel formed therein to contact the battery cells and communicate with an outside of the case.

5 Claims, 7 Drawing Sheets

(51) Int. Cl.

| | |
|---|---|
| *H01M 2/12* | (2006.01) |
| *H01M 2/10* | (2006.01) |
| *H01M 10/04* | (2006.01) |
| *H01M 10/625* | (2014.01) |
| *H01M 10/6563* | (2014.01) |
| *H01M 10/6555* | (2014.01) |
| *H01M 2/04* | (2006.01) |

(52) U.S. Cl.
CPC ..... *H01M 10/0413* (2013.01); *H01M 10/625* (2015.04); *H01M 10/6555* (2015.04); *H01M 10/6557* (2015.04); *H01M 10/6563* (2015.04); *H01M 2/043* (2013.01); *H01M 2/1252* (2013.01); *H01M 2220/20* (2013.01)

(58) Field of Classification Search
USPC .......................................................... 429/53
See application file for complete search history.

(56) References Cited

U.S. PATENT DOCUMENTS

| | | | |
|---|---|---|---|
| 2006/0204840 A1 | 9/2006 | Jeon et al. | |
| 2008/0318121 A1* | 12/2008 | Takagi | H01M 2/1072 429/120 |
| 2009/0181288 A1 | 7/2009 | Sato | |
| 2009/0253026 A1* | 10/2009 | Gaben | B60R 16/04 429/56 |
| 2010/0330408 A1* | 12/2010 | Yoon | H01M 2/0262 429/120 |
| 2011/0212355 A1 | 9/2011 | Essinger et al. | |
| 2012/0040225 A1 | 2/2012 | Raiser | |
| 2013/0149576 A1* | 6/2013 | Lee | B60L 11/1879 429/83 |
| 2013/0244068 A1* | 9/2013 | Kuroda | H01M 2/1083 429/82 |
| 2013/0280565 A1* | 10/2013 | Lee | H01M 2/0207 429/71 |

* cited by examiner

SECONDARY BATTERY MODULE HAVING THROUGH TYPE COOL CHANNEL

TECHNICAL FIELD

The following disclosure relates to a secondary battery module having a through type cool channel to prevent contaminated air generating from a battery cell from being introduced into a vehicle.

BACKGROUND ART

In general, a secondary battery can be charged and discharged unlike a primary battery and is applied to various fields such as a digital camera, a mobile phone, a notebook, and a hybrid car. Therefore, research into the secondary battery has been actively conducted. An example of the secondary battery may include a nickel-cadmium battery, a nickel-metal hydride battery, a nickel-hydrogen battery, a lithium secondary battery, and the like. Further, a lithium secondary battery having high energy density and a discharge voltage among the secondary batteries has been frequently researched and is prevalently commercialized.

In addition, a secondary battery module includes a plurality of battery cells that are stacked in parallel and electrically connected with each other, in which the battery cells are configured to be accommodated in a case.

However, the secondary battery module has a problem in that overcharging occurs during the charging and discharging process of the battery cells included in the case or a temperature in the cell is instantly increased due to internal short occurrence, and the like, that is caused by a failure of specific cells among the plurality of battery cells to generate contaminated air, such that the contaminated air may be leaked to the outside of the case of the secondary battery module and introduced into a vehicle.

Further, the case in which the battery cells are accommodated may be formed to be sealed in order to discharge the contaminated air generated from the battery cell to a specific portion, but a cooling part for cooling heat generated at the time of charging and discharging the battery cell is required, and therefore it is difficult to seal the battery cells.

As the related art, US Patent Laid-Open Publication (20110027632) discloses "battery pack and vehicle with the battery pack".

RELATED ART DOCUMENT

Patent Document

US 20110027632 A1 (2011.02.03.)

DISCLOSURE

Technical Problem

An object of the present invention is to provide a secondary battery module having a through type cool channel capable of preventing contaminated air generated from battery cells from being introduced into a vehicle and easily cooling heat generated from the battery cells, by sealing an electrode assembly, in which a plurality of battery cells are stacked, by a case, forming a separate gas discharge pipe in the case to discharge the gases to a designated place, and coupling both ends of a partition tube having a cool channel formed therein to contact the battery cells and communicate with an outside of the case.

Technical Solution

In one general aspect, there is provided a secondary battery module having a through hole cool channel, including: a plurality of battery cells that are stacked in parallel while being spaced apart from each other by a predetermined distance; a plurality of partition tubes that are stacked and adhered between the battery cells and in an outermost battery cell and have a cool channel formed therein so as to pass through a heat exchange medium; a case that has the battery cells accommodated therein so as to seal the battery cells and is coupled with both ends of the partition tubes so as to communicate with the outside; and a gas discharge pipe that is connected with the case to discharge gases in the case to the outside.

The battery cells may be adhered to each other by disposing an insulating pad between two battery cells and the partition tubes may be each adhered to outer sides of the two battery cells.

The case may include: an upper case of which the inside is hollowed and the lower portion and the longitudinal both sides are opened; a lower case that is coupled with the lower portion of the upper case and has a hollowed inside and opened upper portion and longitudinal both ends; and a pair of side covers that is coupled with both of the upper case and the lower case, provided with a plurality of slots, and coupled with both ends of the partition tubes.

A lower surface in the lower case may be provided with a lower support that supports the lower portions of the battery cells and the partition tubes.

Both sides of the partition tube may be provided with the support parts that are adhered to the side cover.

Both ends of the partition tube may be further protruded to the outer side in a longitudinal direction than the support part to insert both ends of the partition tube into the slot of the side cover.

An edge to which the upper case and the lower case are adhered, an edge of one surface of the side cover adhered to the sides of the upper case and the lower case, and an edge of the slot of one surface of the partition tube adhered to the support part of the side cover and the partition tube may be provided with sealing members.

The upper portion of the support part of the partition tube may be provided with a protruded part and may be further provided with a bus bar that is fixed to the protruded part and is connected with an electrode tap of the battery cell.

Advantageous Effects

According to the exemplary embodiment of the present invention, the secondary battery module having the through type cool channel can discharge the contaminated air generated from the plurality of battery cells sealed by the case to the designated place through the gas discharge pipe to prevent the contaminated air from being introduced into the vehicle and easily cooling the heat generated from the battery cells.

DESCRIPTION OF DRAWINGS

The above and other objects, features and advantages of the present invention will become apparent from the following description of preferred embodiments given in conjunction with the accompanying drawings, in which:

FIG. 3 is an exploded perspective view illustrating an electrode assembly and a radiating fin an exemplary embodiment of the present invention;

DETAILED DESCRIPTION OF MAIN ELEMENTS

1000: SECONDARY BATTERY MODULE HAVING THROUGH TYPE COOL CHANNEL
100: BATTERY CELL
110: ELECTRODE BODY
120: ELECTRODE TAP
130: INSULATING PAD
200: PARTITION TUBE
210: COOL CHANNEL
220: SUPPORT PART
221: PROTRUDED PART
300: ELECTRODE ASSEMBLY
400: CASE
410: UPPER CASE
411: INSPECTION HOLE
412: UPPER COVER
420: LOWER CASE
430: SIDE COVER
431: SLOT
440: SEALING MEMBER
450: LOWER SUPPORT
500: GAS DISCHARGE PIPE
600: BUS BAR
700: CIRCUIT BOARD

BEST MODE

Hereinafter, a secondary battery module having a through type cool channel according to an exemplary embodiment of the present invention as described above will be described in detail with reference to the accompanying drawings.

Figure 1:
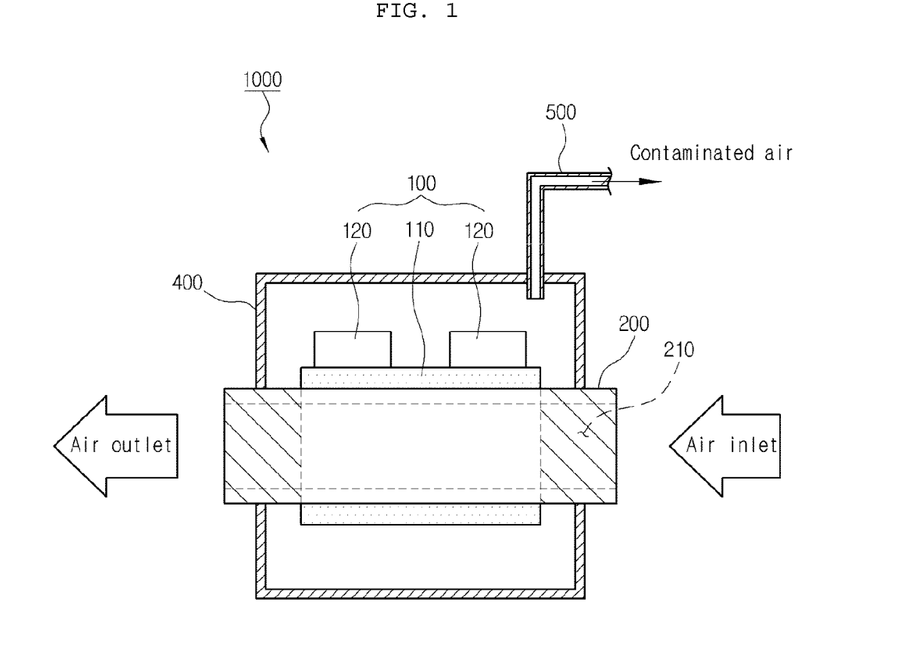
FIG. 1 is a schematic diagram illustrating a secondary battery module having a through type cool channel according to an exemplary embodiment of the present invention.

FIG. 1 is a schematic diagram illustrating a secondary battery module 1000 having a through type cool channel according to an exemplary embodiment of the present invention.

As illustrated, a secondary battery module having a through type cool channel according to an exemplary embodiment of the present invention includes: a plurality of battery cells 100 that are stacked in parallel while being spaced apart from each other by a predetermined distance; a plurality of partition tubes 200 that are stacked and adhered between the battery cells 100 and in an outermost battery cell 100 and have a cool channel 210 formed therein so as to pass through a heat exchange medium; a case 400 that has the battery cells 100 accommodated therein so as to seal the battery cells 100 and is coupled with both ends of the partition tubes 200 so as to communicate with the outside; and a gas discharge pipe 500 that is connected with the case 400 to discharge gases in the case 400 to the outside.

First, the battery cell 100 has an electrode tap 120 that is formed at one portion of the electrode body 110. The electrode body 110 is a method that is configured of an anode, a cathode, an electrolyte, and a separator separating the anode and the cathode to charge and discharge electricity and the electrode tap 120 is a portion that transfers current generated at the time of discharging electricity from the electrode body 110 or introduced at the time of charging electricity from the outside.

In this case, the battery cell 100 may be a pouch type cell that is sealed by being enclosed with a pouch, a form in which the case is coupled with an outer side of the pouch type cell, or a form in which a plurality of battery cells 100 are stacked.

Further, the partition tube 200 is stacked and adhered between the battery cells 100 and in the outermost battery cell 100 and has the cool channel 210 formed therein to pass through the heat exchange medium. That is, the battery cell 100 is configured to cool the heat generated from the battery cell 100 by the heat exchange medium passing along the cool channel 210 of the partition tube 200. In this case, the partition tube 200 is formed longer than the battery cell 100, such that the longitudinal both ends thereof may be protruded to both sides of the battery cell 100.

Figure 2:
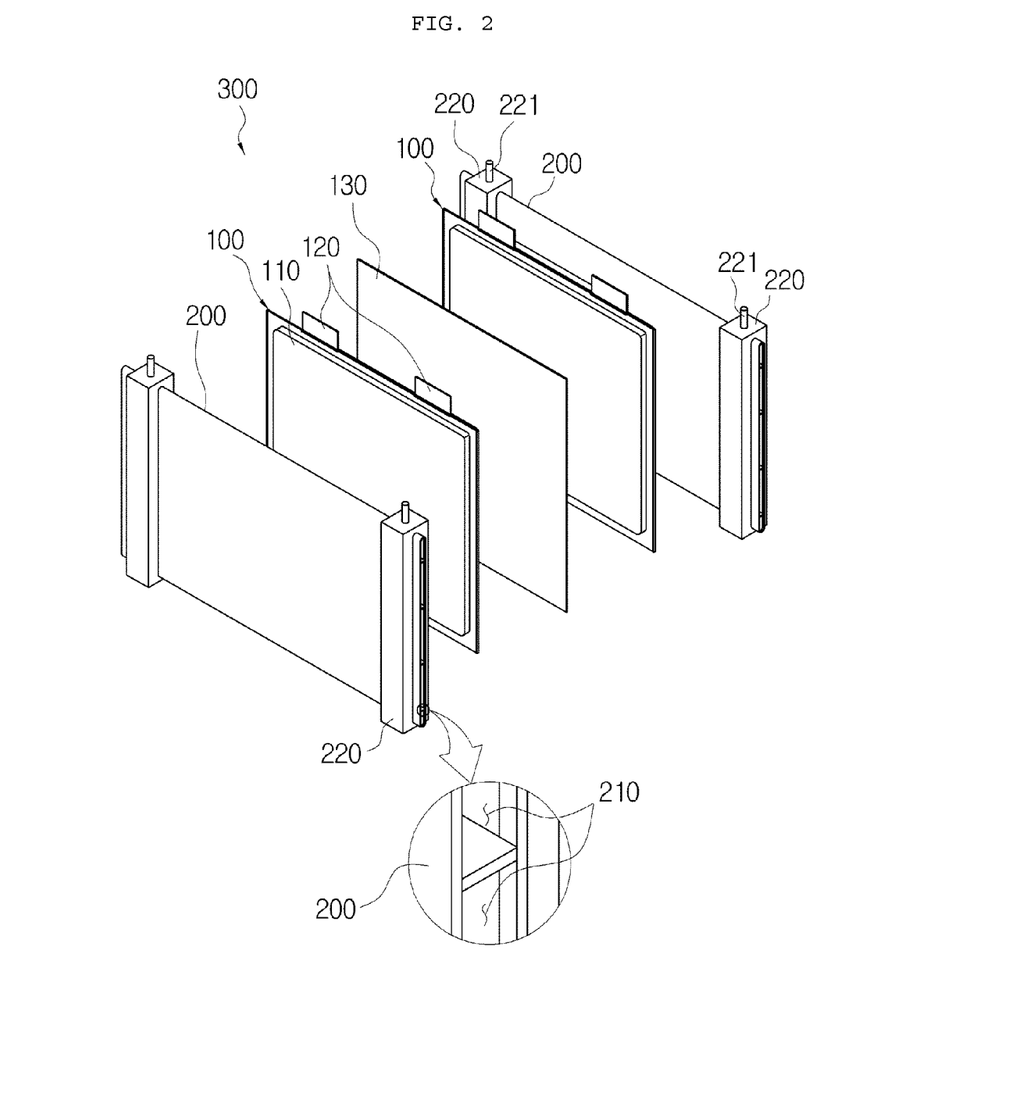
FIGS. 2 and 3 are an exploded perspective view and an assembly perspective view illustrating a battery cell and a partition tube according to an exemplary embodiment of the present invention.
Figure 3:
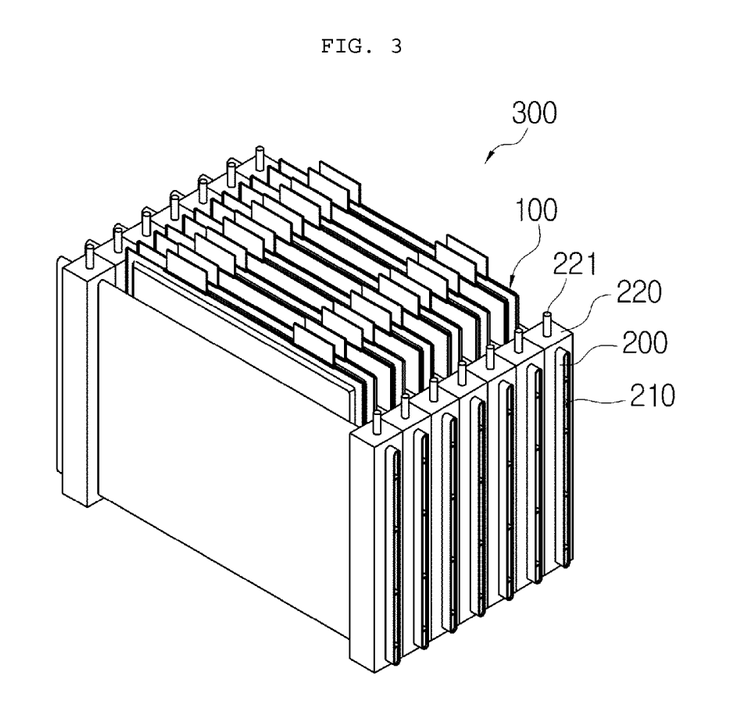

In this case, as illustrated in FIGS. 2 and 3, the battery cells 100 are adhered to each other by disposing an insulating pad 130 between two battery cells 100, the partition tubes 200 may each be adhered to the outer sides of the two battery cells 100, and an inner side of the cool channel 210 of the partition tube 200 is provided with a fin type rib in a longitudinal direction, thereby improving structural rigidity and heat exchange efficiency of the partition tube 200. In addition, the cool channel 210 and the heat exchange medium may be variously formed.

In this case, the insulating pad 130 electrically insulates between the two battery cells 100 and is made of elastomer, such that a tolerance of a dimension in a stacked direction and vibration and impact may be absorbed.

As such, the plurality of battery cells 100 are stacked to be adhered to the partition tubes 200, thereby forming the electrode assembly 300.

In addition, the case 400 is formed to have the battery cells 100 accommodated therein and to seal the battery cells 100. In this case, both sides of the case 400 are coupled with both ends of the partition tube 200, such that the battery cells 100 are formed to pass the heat exchange medium along the cool channel 210 of the partition tube 200 from one portion of the outside of the case 400 so as to perform the heat exchange and discharge the heat exchange medium to the other portion of the outside of the case 400, in the state in which the battery cells 100 are sealed by the case 400. That is, the both ends of the partition tube 200 are connected with the outer side of the case 400 to pass a heat exchange medium through the inside of the case 400 through the cool channel 201 of the partition tube 200 and the battery cells 100 are formed to be completely sealed by the case 400.

Herein, the gas discharge pipe 500 is connected with the case 400 to discharge contaminated air generated from the battery cell 100 in the case 400 to the outside along the gas discharge pipe 500. In this case, one portion of the gas discharge pipe 500 is connected with the case 400 and the other portion thereof is disposed at the designated place to discharge the contaminated air only to the designated place.

Therefore, when the contaminated air are generated due to the abnormality of the battery cell 100, the gases are not discharged to other places due to the sealed case and are discharged only to the designated place along the gas discharge pipe 500, thereby preventing the contaminated air from being introduced into the vehicle. In addition, the battery cells sealed by the case may be easily cooled by the partition tube of which the cool channel communicates with the outside of the case. That is, the secondary battery module having a through type cool channel according to the exemplary embodiment of the present invention has a structure in which the battery cell is sealed by the case so as to discharge the contaminated air generated from the battery cell to the designated place and may be easily cooled by communicating the cool channel of the partition tube adhered to the battery cell with the outside of the case.

Further, the case 400 of the secondary battery module 1000 having a through type cool channel according to the exemplary embodiment of the present invention may include: an upper case 410 of which the inside is hollowed and the lower portion and the longitudinal both sides are opened; a lower case 420 that is coupled with the lower portion of the upper case 410 and has a hollowed inside and opened upper portion and longitudinal both ends; and a pair of side covers 430 that is coupled with both of the upper case 410 and the lower case 420, provided with a plurality of slots 431, and coupled with both ends of the partition tubes 200.

As illustrated in FIGS. 2 to 5, the electrode assembly 300 is formed by adhering the partition tubes 200 between the plurality of battery cells 100 stacked in parallel and coupling the partition tube 200 with the battery cell 100 disposed at the outermost side by a fastening member so that the partition tube 200 is adhered to the battery cell 100 and the electrode assembly 300 is enclosed by the upper case 410, the lower case 420, and the pair of side covers 430 and both ends of the partition tube 200 are connected with the slot 431 formed on the side cover 430.

That is, the battery cells 100 are sealed by the upper and lower cases 410 and 420 and the pair of side covers 430 and are configured to discharge the contaminated air generated from the battery cell 100 to the designated place through the gas discharge pipe 500 connected with the upper case 410. In addition, the heat exchange medium introduced through the slot 431 of one portion of the side cover 430 passes through the cool channel 210 of the partition tube 200 and is heat exchanged and is discharged to the slot 431 formed on the other portion of the side cover 430, such that the battery cells 100 are cooled.

In this case, the partition tube 200 is formed in a plate shape and is adhered to the battery cell 100, such that the partition tube 200 may be configured to rapidly transfer the heat generated during the charging or discharging process of the battery cell 100 to the heat exchange medium passing through the cool channel 210. In addition, the partition tube 200 may be made of materials having high heat conductivity such as aluminum or copper and may be made of materials that may rapidly transfer the heat generated from the battery cell 100.

Figure 6:
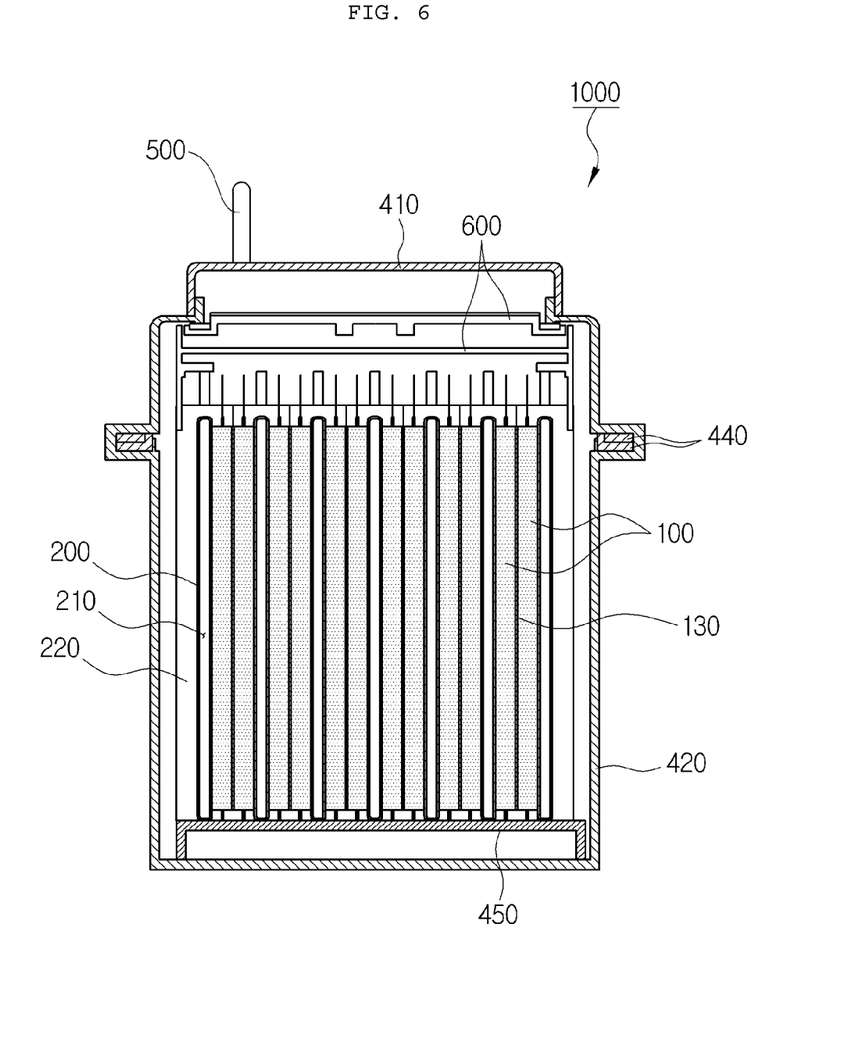
FIGS. 6 and 7 are cross-sectional views taken along the direction AA' and the direction BB' of FIG. 5.

In addition, the lower surface in the lower case 420 is provided with a lower support 450 that supports the lower portions of the battery cells 100 and the partition tubes 200. That is, as illustrated in FIG. 6, the lower support 450 may space the battery cells 100 and the partition tubes 200 by a predetermined height from the bottom surface of the lower case 420 and may easily couple the side cover 430 with the partition tube 200 while matching the heights of the side cover 430 and the partition tube 200.

In addition, both sides of the partition tube 200 are provided with the support parts 220 that are adhered to the side cover 430. The support part 220 is to easily seal the end of the partition tube 200 and the slot 431 when both ends of the partition tube 200 are connected with the slot 431 of the side cover 430 and may serve to lock the side cover 430 to the support part 220 of the partition tube 200 to prevent the side cover 430 from being entered inwardly. In addition, the support part 220 is provided with a through hole to stack the battery cells 100 and the partition tubes 200 and may easily couple the battery cells 100 with the partition tubes 200 by fastening members such as a long bolt, a nut, and the like.

Figure 4:
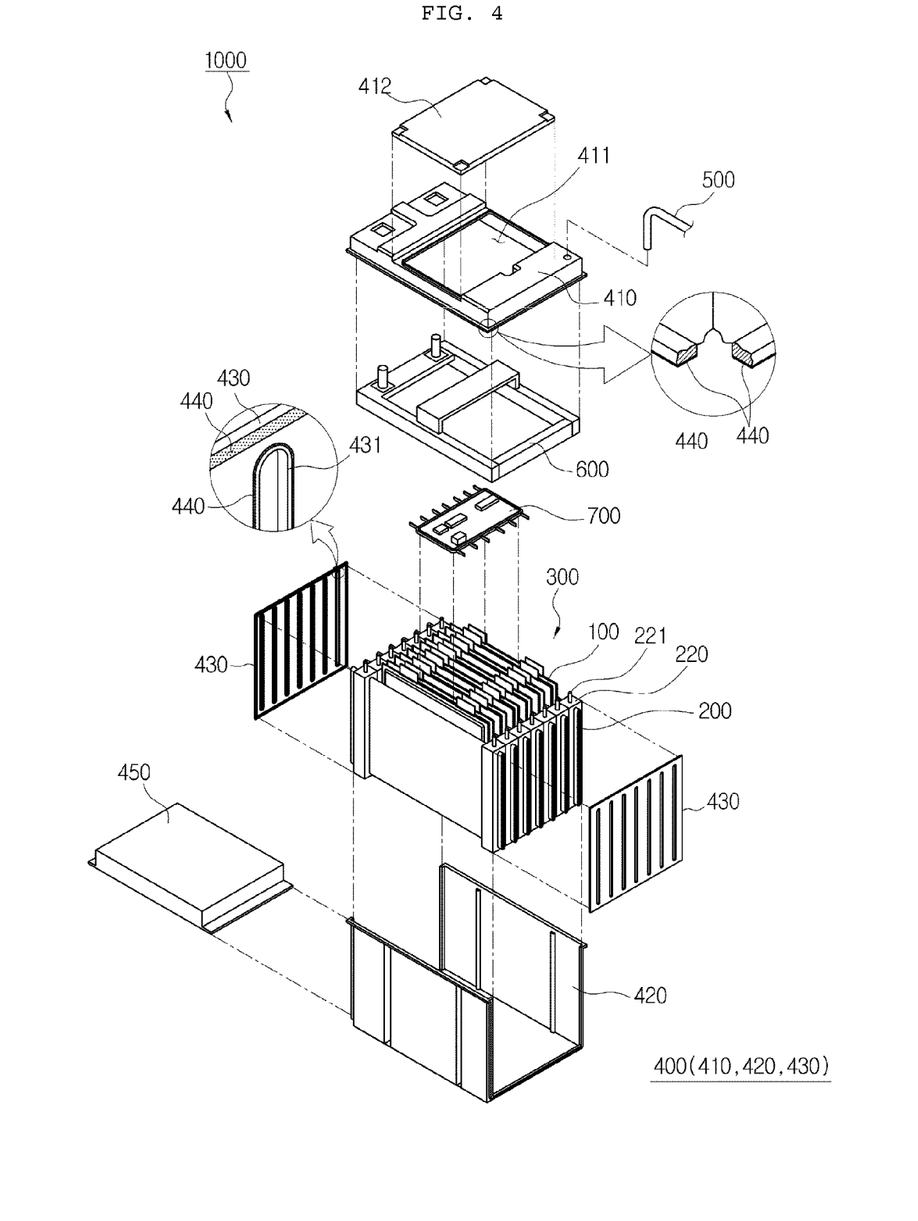
FIGS. 4 and 5 are an exploded perspective view and an assembly perspective view illustrating a secondary battery module having a through type cool channel according to the exemplary embodiment of the present invention.
Figure 5:
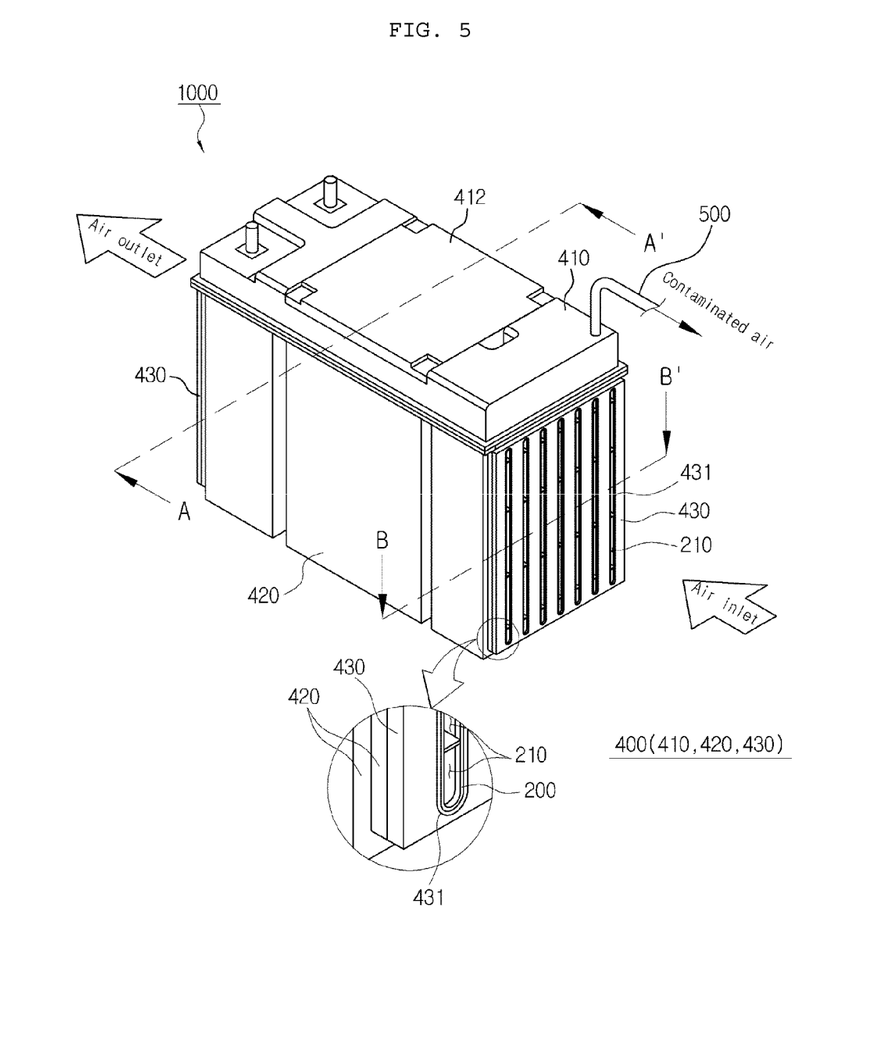

Further, as illustrated in FIGS. 3 to 5, the both ends of the partition tube 200 may be further protruded to the outer side in a longitudinal direction than the support part 220 to insert the both ends of the partition tube 200 into the slot 431 of the side cover 430. Therefore, the both ends of the partition tube 200 is inserted into the slot 431 of the side cover 430 coupled with the upper and lower cases 410 and 420, such that the partition tubes 200 may be firmly fixed to the case 400, thereby easily keeping the airtight of the portion at which the slot 431 is coupled with the outer side of the partition tube 200.

Figure 7:
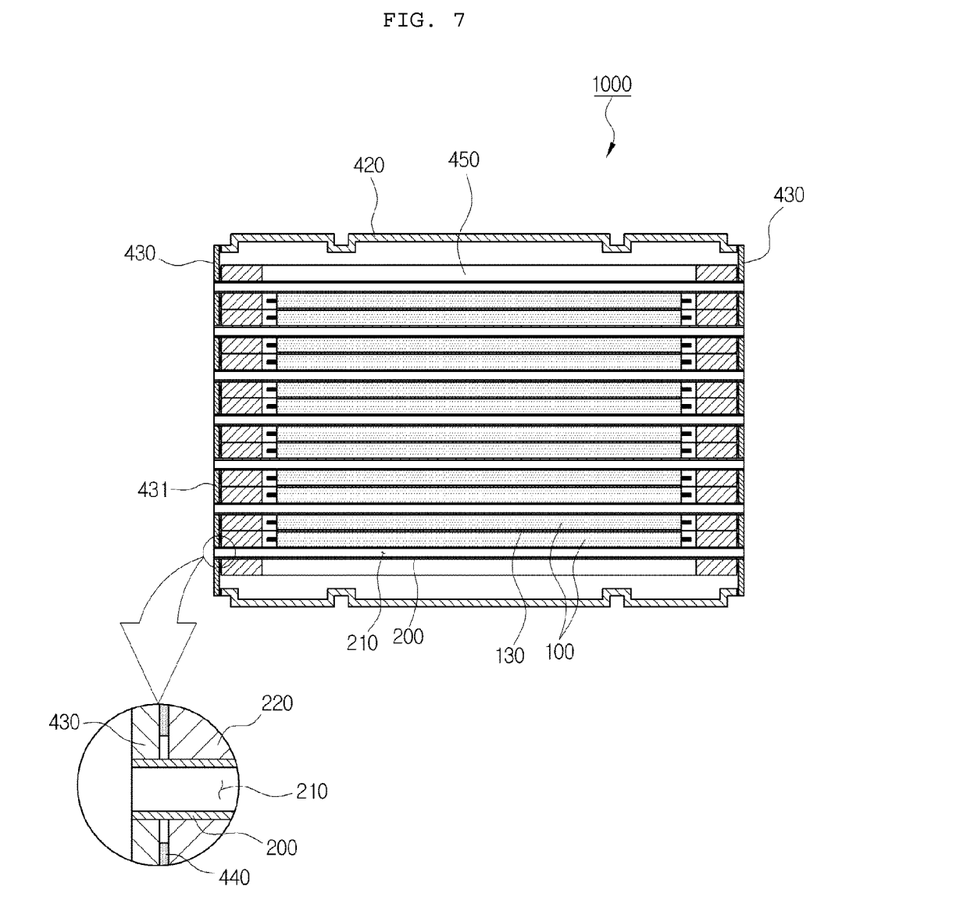

Further, as illustrated in FIGS. 5 and 7, sealing members 440 are formed at an edge to which the upper case 410 and the lower case 420 are adhered, an edge of one surface of the side cover 430 adhered to the sides of the upper case 410 and the lower case 420, and an edge of the slot 431 of one surface of the partition tube 200 adhered to the support part 220 of the side cover 430 and the partition tube 200. That is, the sealing member 440 is formed at each coupled portion so that the battery cell 100 may be sealed by keeping the airtight of the coupled portions and the edge portions of the upper and lower cases 410 and 420 may be provided with a flange and coupled by the fastening member. Herein, the edge portion of the inner side of the side cover 430 is coupled with the side of the upper and lower cases 410 and 420. In addition, the sealing member 440 is formed around the slot 431 of the inner side of the side cover 430 that is a portion at which the partition tube 200 is inserted into the slot 431 so as to be adhered to the support part 220, thereby easily sealing the battery cells 100.

In addition, the upper portion of the support part 220 of the partition tube 200 is provided with a protruded part 221 and may further provided with a bus bar 600 that is fixed to the protruded part 221 and is connected with the electrode tap 120 of the battery cell 100. That is, the bus bar 600 connected with the electrode tap 120 may be fixed to the protruded part 221 formed on the upper portion of the support part 220 as illustrated in FIGS. 4 and 6, such that there is no separate part for fixing the bus bar 600. In this case, the support part 220 and the protruded part 221 are manufactured by extruding the partition tube 200 and the partition tube 200, the support part 220, and the protruded part 221 may be integrally manufactured by performing an insert injection on the manufactured partition tube 200.

In addition, the upper portion of the electrode assembly 300 may be coupled with a circuit board 700 that is connected with the electrode tap 120 of the battery cell 100 and the upper surface of the upper case 410 is provided with an inspection hole 411 for inspecting a circuit board 700 and may be coupled with the upper cover 412.

As set forth above, according to the exemplary embodiment of the present invention, the secondary battery module having the through type cool channel can discharge the contaminated air generated from the plurality of battery cells sealed by the case to the designated place through the gas discharge pipe to prevent the contaminated air from being introduced into the vehicle and easily cooling the heat generated from the battery cells.

The present invention is not limited to the embodiments described above, may be used for various fields, and may be modified in various ways without departing from the spirit of the present invention described in claims.

The invention claimed is:

1. A secondary battery module having a through hole cool channel, comprising: a plurality of battery cells that are stacked in parallel while being spaced apart from each other by a predetermined distance; at least one partition tube parallel to and adjacent to at least one battery cell of the plurality of battery cells, wherein the at least one partition tube has a cool channel formed therein to allow a heat exchange medium to pass through; a case that has the plurality of battery cells accommodated therein so as to seal the plurality of battery cells and is configured to allow the at least one partition tube to communicate with the outside; and a gas discharge pipe that is connected with the case to discharge gases in the case to the outside, wherein the case includes: an upper case having a hollow interior and a lower portion and longitudinal both sides are opened; a lower case that is coupled with the lower portion of the upper case and having a hollow interior and opened upper portion and longitudinal both ends; and a pair of side covers that is formed apart from the upper case and the lower case and coupled with both of the upper case and the lower case, provided with a plurality of slots, and coupled with both ends of the at least one partition tube, wherein both sides in a longitudinal direction of the at least one partition tube are provided with support parts that are adhered to the pair of side covers, wherein both ends of the at least one partition tube protrude further to the outer side in a longitudinal direction than the support parts to insert the both ends of the at least one partition tube into the plurality of slots of the pair of side covers, and wherein an upper portion of the support parts of the at least one partition tube is provided with a protruded part and is further provided with a bus bar that is fixed to the protruded part and is connected with an electrode tap of the at least one battery cell.

2. The secondary battery module having a through hole cool channel of claim 1, wherein the plurality of battery cells are adhered to each other by disposing an insulating pad between two battery cells among the plurality of battery cells, and the at least one partition tube and a further partition tube are each adhered to outer sides of the two battery cells.

3. The secondary battery module having a through hole cool channel of claim 1, wherein a lower surface in the lower case is provided with a lower support that supports lower portions of the plurality of battery cells and the at least one partition tube.

4. The secondary battery module having a through hole cool channel of claim 1, wherein an edge to which the upper case and the lower case are adhered, an edge of one surface of the pair of side covers adhered to sides of the upper case and the lower case, and an edge around the plurality of slots on one surface of the pair of side covers and adhered to the support parts of the plurality of partition tubes are provided with sealing members.

5. A secondary battery module, comprising: a plurality of battery cells parallel to and spaced apart by a predetermined distance, from each other; at least one partition tube parallel to and adjacent to at least one battery cell of the plurality of battery cells, wherein the at least one partition tube has a cool channel formed therein, the cool channel configured to allow a heat exchange medium to pass through, wherein both sides in a longitudinal direction of the at least one partition tube are provided with support parts, a case configured to accommodate and seal the plurality of battery cells therein, and configured to allow the at least one partition tube to communicate with an outside of the secondary battery module, wherein the case comprises: an upper case having a lower portion; a lower case configured to couple with the lower portion of the upper case; a first side cover and a second side cover opposing each other, configured to couple with both of the upper case and the lower case, wherein the first side cover has a plurality of first side cover slots, each slot of the plurality of first side cover slots is in fluid communication with the cool channel of the at least one partition tube, wherein the second side cover has a plurality of second side cover slots, each slot of the plurality of second side cover slots is in fluid communication with the cool channel of the at least one partition tube, wherein the first and second side covers are adhered to the support parts; and a gas discharge pipe connected with the case, wherein the gas discharge pipe is configured to discharge gases in the case to the outside of the secondary battery module, and wherein an upper portion of the support parts of the at least one partition tube is provided with a protruded part and is further provided with a bus bar that is fixed to the protruded part and is connected with an electrode tap of the at least one battery cell.

* * * * *